Nov. 27, 1934. A. L. NELSON 1,982,396
PISTON
Original Filed June 27, 1929 2 Sheets-Sheet 1
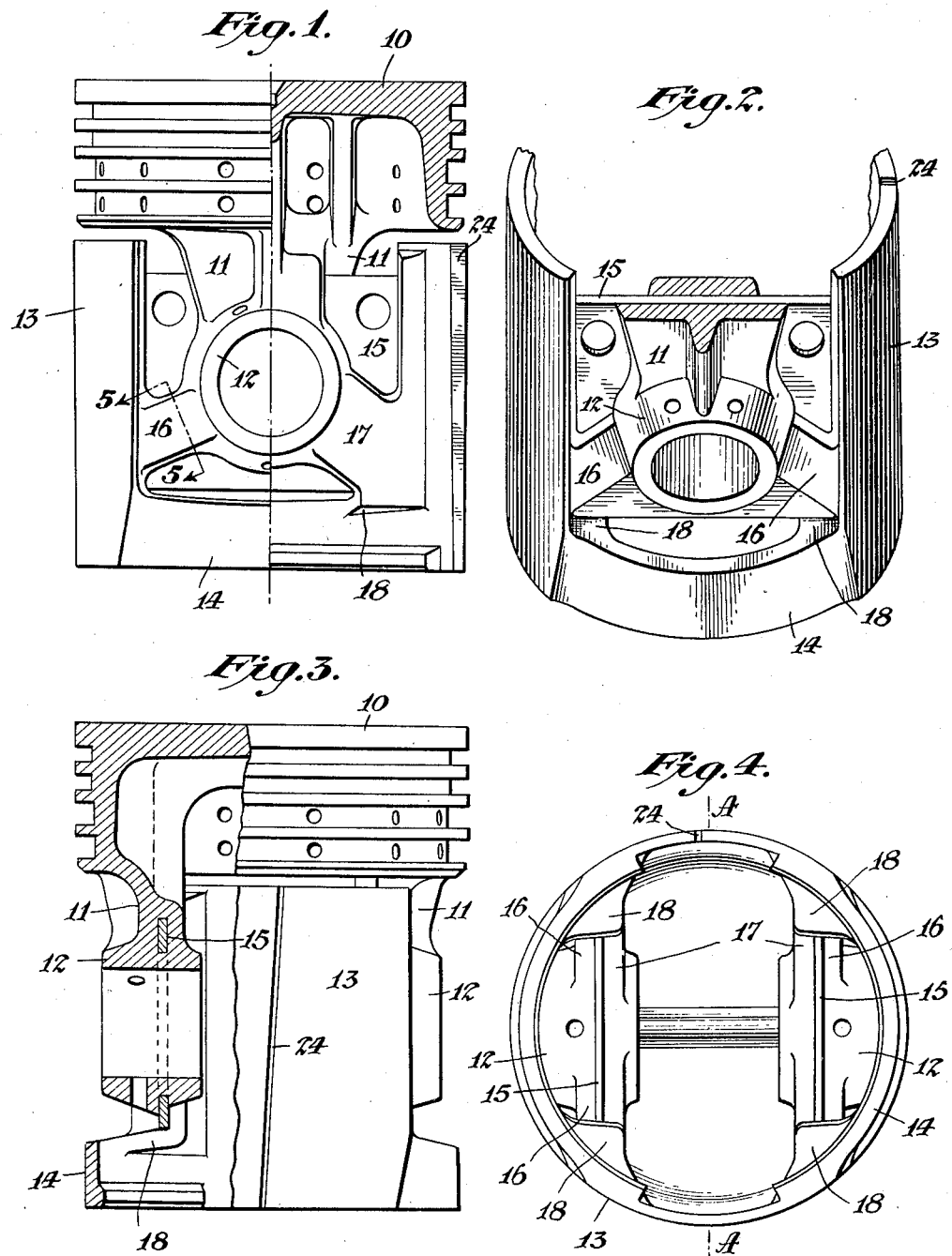
Inventor
Adolph L. Nelson
By his Attorney
Frank J. Kent.

Nov. 27, 1934.   A. L. NELSON   1,982,396
PISTON
Original Filed June 27, 1929   2 Sheets-Sheet 2
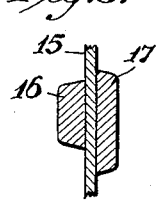
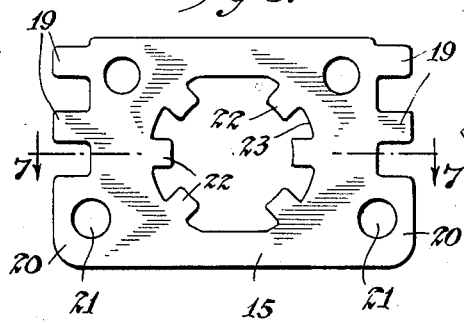
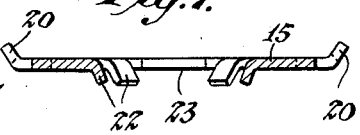
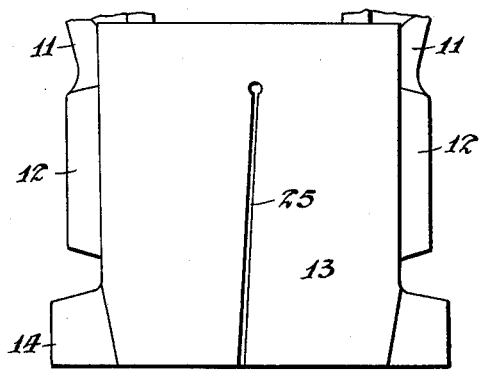
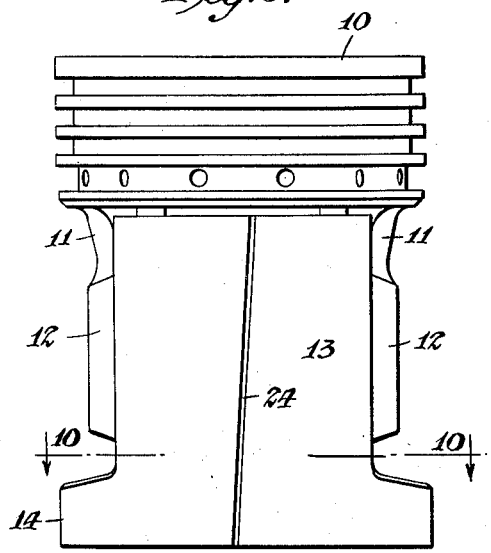
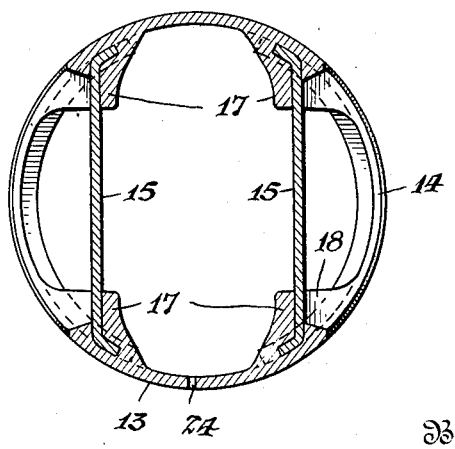
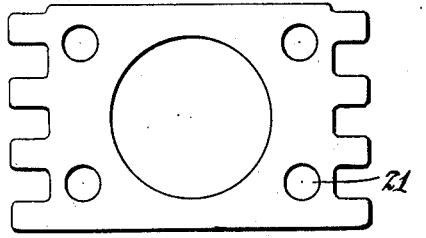
Inventor
Adolph L. Nelson,
By his Attorney
Frank J. Kent.

Patented Nov. 27, 1934

1,982,396

UNITED STATES PATENT OFFICE 1,982,396

PISTON

Adolph L. Nelson, Detroit, Mich.

Application June 27, 1929, Serial No. 374,013
Renewed May 12, 1931

11 Claims. (Cl. 309—13)

This invention relates to a piston for internal combustion engines, and is particularly adapted to engines for motor vehicles.

The invention provides a structure in which struts of relatively inexpansible material are used to determine the spacing of cylinder-bearing portions, which may be of light weight piston material.

The cylinder-bearing portions are connected to the piston pin bosses by ties extending along both the inner and outer sides of each strut, and each of the inner ties extends around the bottom edge of a strut and joins the skirt band that extends under the piston pin bosses.

A feature of the invention resides in the provision of a piston which includes lateral ties connecting the cylinder-bearing portions to the pin bosses, together with a slot extending upwardly partway into one or both of the cylinder-bearing portions.

Other objects and advantages of the invention will become apparent as the description proceeds.

While preferred forms of the invention have been disclosed for purposes of illustration, it should be understood that various changes may be made in the structure and arrangement of parts without departing from the spirit and scope of the invention as hereinafter set forth and claimed.

In the drawings:

Fig. 1 is a side view, half in elevation and half in section, of a piston embodying the invention.

Fig. 2 is a fragmentary perspective view.

Fig. 3 is a view similar to Fig. 1, but taken at right angles to Fig. 1.

Fig. 4 is a bottom plan view.

Fig. 5 is a section on line 5—5 of Fig. 1.

Fig. 6 is a plan view of a strut for use in the piston.

Fig. 7 is a section on line 7—7 of Fig. 6.

Fig. 8 is a fragmentary side elevation showing a modified structure.

Fig. 9 is a side elevation showing a further modification.

Fig. 10 is a section on line 10—10 of Fig. 9.

Fig. 11 is a view similar to Fig. 6 of a modified strut.

Referring to the drawings more particularly, the numeral 10 indicates the head of the piston, from which depend piers 11 to which are attached the piston pin bosses 12. The cylinder-bearing portions 13 are connected by a band 14 at the lower end of the piston. The parts thus far described may be formed of any suitable piston material, such as an aluminum alloy.

A pair of struts 15 extend between the cylinder-bearing portions. These struts are formed of some material having a lower co-efficient of thermal expansion than the material of the head and cylinder-bearing portions.

A tie 16 extends at a downward angle along the outer side of each strut from the pin boss to each of the cylinder-bearing portions. Similar ties 17 extend along the inner sides of the struts, all of the ties 16 and 17 being homogeneous with the piston pin bosses and the cylinder-bearing portions. The inner ties 17 are heavier than the outer ties 16, and the fact that the heavier ties have a stronger action in expansion and contraction is utilized to cause the piston to expand faster on the diameter A—A of Fig. 4 than it otherwise would.

Each of the inner ties 17 extends around the lower edge of a strut and forms a sector-shaped web 18 that joins and reinforces the band 14. These webs 18 tend to hold in the parts of band 14 lying below the pin bosses and to force out the bearing portions on diameter A—A and help to give the skirt a good bearing in the cylinder.

The strut members are formed on each end with projections 19. The lower projection 20 is wider than the others and is formed with an aperture 21 through which the material of the skirt passes. The projections 19 and 20 are bent at an angle to the main body of the strut, and the projections 22 which extend into the central aperture 23 are bent in the opposite direction. The strut is of such a width that it extends across the piston both above and below the piston pin boss.

If desired, the inner projections 22 may be omitted, as shown in Fig. 11, and the apertures 21 may be moved inwardly so that the inner and outer ties are bonded together through these apertures.

The lower circular band 14 can be relieved under the pin bosses as indicated in Figs. 1 to 4 and 8, or this part of the band can be left unrelieved, as shown in Fig. 9. The use of the relief is advisable where the lower end of the piston overruns the lower end of the cylinder.

This piston can be used without any vertical slots extending upwardly from the lower edge of the skirt. In some cases a vertical slot extending entirely through one of the cylinder-bearing portions, as at 24 in Figs. 1 to 4, may be used. Or one or both of the cylinder-bearing portions can be formed with a slot 25 extending part way up from the bottom of the skirt as in Fig. 8.

I claim:

1. A piston comprising a head, piers depending from the head and having piston pin bosses formed therein, a circular portion at the lower end of the piston, cylinder-bearing portions extending upwardly from the circular portion, a pair of struts extending between the cylinder-bearing portions, a pair of ties extending along the outside of each strut from each pin boss to the cylinder-bearing portions, a pair of ties extending along the inside of each strut from each pin boss to the cylinder-bearing portions, the inside ties extending around the lower edge of a strut and then joining the lower circular portion.

2. A piston comprising a head, piers depending from the head and having piston pin bosses formed therein, a circular portion at the lower end of the piston, cylinder-bearing portions extending upwardly from the circular portion, a pair of struts of material less expansible than the material of the head extending between the cylinder-bearing portions, a pair of ties extending along the outside of each strut from each pin boss to the cylinder-bearing portions, a pair of ties extending along the inside of each strut from each pin boss to the cylinder-bearing portions, the inside ties extending around the lower edge of a strut and then joining the lower circular portion.

3. A piston comprising a head, piers depending from the head and having piston pin bosses formed therein, a circular portion at the lower end of the piston, cylinder-bearing portions extending upwardly from the circular portion, a pair of struts extending between the cylinder-bearing portions, a pair of ties extending downwardly along the outside of each strut from each pin boss to the cylinder-bearing portions, a pair of ties extending downwardly along the inside of each strut from each pin boss to the cylinder-bearing portions, the inside ties extending around the lower edge of a strut and projecting horizontally and forming a sector-shaped web that joins the lower circular portion.

4. A piston comprising a head, piers depending from the head and having piston pin bosses formed therein, a circular portion at the lower end of the piston, cylinder-bearing portions extending upwardly from the circular portion, a pair of struts of material less expansible than the material of the head extending between the cylinder-bearing portions, a pair of ties extending downwardly along the outside of each strut from each pin boss to the cylinder-bearing portions, a pair of ties extending downwardly along the inside of each strut from each pin boss to the cylinder-bearing portions, the inside ties extending around the lower edge of a strut and projecting horizontally and forming a sector-shaped web that joins the lower circular portion, all of said ties being homogeneous with the pin bosses and the cylinder-bearing portions.

5. A piston comprising a head, piers depending from the head and carrying piston pin bosses, cylinder-bearing portions on opposite sides of the piston, a pair of struts extending between the cylinder-bearing portions, a tie extending at a downward angle from each pier to each cylinder-bearing portion, at least one of the cylinder-bearing portions being formed between the struts with a slot extending partway up from the bottom of the skirt.

6. A piston comprising a head, piers depending from the head and having piston pin bosses formed therein, a circular portion at the lower end of the piston, cylinder-bearing portions extending upwardly from the circular portion, a pair of struts of material less expansible than the material of the head extending between the cylinder-bearing portions, a pair of ties extending downwardly along the outside of each strut from each pin boss to the cylinder-bearing portions, a pair of ties extending downwardly along the inside of each strut from each pin boss to the cylinder-bearing portions, all of said ties being homogeneous with the pin bosses and the cylinder-bearing portions, at least one of the cylinder-bearing portions being formed between the struts with a slot extending upwardly into the cylinder-bearing portion from the bottom end of the skirt.

7. A piston comprising a head, piers depending from the head and carrying piston pin bosses, cylinder-bearing portions on opposite sides of the piston, a pair of struts extending between the cylinder-bearing portions, a tie extending at a downward angle from each pier to each cylinder-bearing portion, at least one of the cylinder-bearing portions being formed between the struts with a slot extending upwardly from the bottom of the cylinder-bearing portion.

8. A piston comprising a head, piers depending from the head and carrying piston pin bosses, cylinder-bearing portions on opposite sides of the piston, a pair of struts extending between the cylinder-bearing portions, a tie extending at a downward angle from each pier to each cylinder-bearing portion, at least one of the cylinder-bearing portions being formed between the struts with a slot extending entirely through the cylinder-bearing portion from the top to the bottom thereof.

9. A piston comprising a head, piers depending from the head and carrying piston pin bosses, cylinder-bearing portions on opposite sides of the piston, a pair of struts extending between the cylinder-bearing portions, a tie extending at a downward angle from each pier to each cylinder-bearing portion, at least one of the cylinder-bearing portions being formed between the struts with a slot extending upwardly from the bottom of the cylinder-bearing portion and terminating below the upper end of the cylinder-bearing portion.

10. A piston comprising a head, piers depending from the head and having piston pin bosses formed therein, a circular portion at the lower end of the piston, cylinder-bearing portions extending upwardly from the circular portion, ties extending outwardly and downwardly from the pin bosses to the cylinder-bearing portions, the head, piers, cylinder-bearing portions, and ties being formed of a single, homogeneous piece of light weight metal, a pair of struts of less expansible material than that of the cylinder-bearing portions extending chordally of the piston and attached to the cylinder-bearing portions, each strut being in the form of a flat plate apertured for passage of the piston pin and extending across the piston above and below a piston pin boss, the upper ends of the cylinder-bearing portions being separated from the head and from the piers, at least one of the cylinder-bearing portions being formed between the struts with a slot extending upwardly from the bottom of the cylinder-bearing portion and extending past the circumferential zone of the ties.

11. A piston comprising a head, piers depending from the head and having piston pin bosses formed therein, a circular portion at the lower end of the piston, cylinder-bearing portions extending upwardly from the circular portion, ties extending outwardly and downwardly from the pin bosses to the cylinder-bearing portions, the head, piers, cylinder-bearing portions, and ties being formed of a single, homogeneous piece of light-weight metal, a pair of struts of less expansible material than that of the cylinder-bearing portions extending chordally of the piston and attached to the cylinder-bearing portions, each strut being in the form of a flat plate apertured for passage of the piston pin and extending across the piston above and below a piston pin boss, the upper ends of the cylinder-bearing portions being separated from the head and from the piers, one of the cylinder-bearing portions being formed between the struts with a slot extending entirely through the cylinder-bearing portion from the top to the bottom thereof.

ADOLPH L. NELSON.